UNITED STATES PATENT OFFICE.

JOHN MEŸENBERG, OF ST. LOUIS, MISSOURI.

PROCESS OF PRESERVING MILK.

SPECIFICATION forming part of Letters Patent No. 308,422, dated November 25, 1884.

Application filed July 9, 1884. (No specimens.)

*To all whom it may concern:*

Be it known that I, JOHN MEŸENBERG, of the city of St. Louis, in the State of Missouri, have invented a certain new and useful Improvement in Process of Condensing Milk, of which the following is a full, clear, and exact description.

In carrying my invention into effect I heat the milk as it comes from the cows with steam out of contact with the milk, the milk being stirred and exposed to the air until about one-sixth of its volume is evaporated. Next the milk is cooled out of contact with the air by cold water, while the stirring is continued, the milk of course being out of contact with the water. Next all vapors and air that might be generated are withdrawn from the milk by exhaustion. This operation prevents all changes or the formation of germs of fermentation. The milk is next cooled down to from 100° to 105° Fahrenheit. Then it is twice strained and condensed to the desired consistence under *vacuo* to from one-fourth to one-half of its original volume, until the condensing operation is finished, to prevent contact of the milk with the atmosphere, for the purpose set forth. After this operation the milk is drawn off and cooled by cold water (and while being continually stirred) down to from 50° to 60° Fahrenheit. After this the milk is put into tight cans of different sizes, as demanded by the trade or customers may want it, being careful not to fill them completely, as there is some room needed in the can for the motion of the milk in the next process. The cans are then hermetically sealed and continually agitated by revolving them, and heated by steam to not over 240° Fahrenheit, kept at that temperature for a short time, and then cooled down with cold air to about 60° Fahrenheit. This last cooling process must be done quickly. After this the cans are examined to discover if all are air-tight, and if so are then ready for the market.

I am aware that milk to be preserved and condensed has been heated beneath the boiling-point of 212° Fahrenheit, to fit it for evaporation *in vacuo*.

I am also aware that the milk has been stirred while being heated.

I am also aware that milk has been put into cans, hermetically sealed, and heated while the cans have been revolved. Such steps in the process, therefore, I do not claim, broadly.

I claim as my invention—

1. The process for condensing and preserving milk herein described, which consists in heating the milk by steam out of contact therewith while the milk is exposed to the air and stirred, until about one-sixth of its volume is evaporated, then cooling the milk while the stirring is continued and the vapors and air are being drawn off by exhaustion, continuing the cooling down to about 100° or 105° Fahrenheit, then straining it, then condensing it *in vacuo* down to about one-half or one-fourth of its original volume, then cooling it down to about 50° or 60° Fahrenheit, while still stirring it, and finally canning it, as set forth.

2. The process for condensing and preserving milk herein described, which consists in heating the milk by steam out of contact therewith while the milk is exposed to the air and stirred, until about one-sixth of its volume is evaporated, then cooling the milk while the stirring is continued and the vapors and air are being drawn off by exhaustion, continuing the cooling down to about 100° or 105° Fahrenheit, then straining it, then condensing it *in vacuo* down to about one-half or one-fourth of its original volume, then cooling it down to about 50° or 60° Fahrenheit while still stirring it, then canning it without quite filling the cans, then hermetically sealing the cans, agitating the cans of milk while exposed to heat of not more than 240° Fahrenheit, and finally cooling them down to from about 50° to 60° Fahrenheit, as set forth.

JOHN MEŸENBERG.

In presence of—
GEO. H. KNIGHT,
SAML. KNIGHT.